(12) United States Patent
Salim

(10) Patent No.: US 12,303,963 B2
(45) Date of Patent: May 20, 2025

(54) AUTOMOTIVE BENDING TOOL AND METHOD OF REPAIRING AUTOMOBILE TURBOCHARGER SYSTEM WITHOUT REMOVING OR DISASSEMBLING COMPONENTS OF THE TURBOCHARGER

(71) Applicant: Ahmad Salim, Knoxville, TN (US)

(72) Inventor: Ahmad Salim, Knoxville, TN (US)

( * ) Notice: Subject to any disclaimer, the term of this patent is extended or adjusted under 35 U.S.C. 154(b) by 69 days.

(21) Appl. No.: 18/098,905

(22) Filed: Jan. 19, 2023

(65) Prior Publication Data

US 2024/0246210 A1   Jul. 25, 2024

(51) Int. Cl.
| | |
|---|---|
| *B21D 7/06* | (2006.01) |
| *B21D 7/00* | (2006.01) |
| *B21D 11/07* | (2006.01) |
| *B21F 1/00* | (2006.01) |
| *B23P 6/00* | (2006.01) |
| *F02B 37/18* | (2006.01) |
| *B25B 33/00* | (2006.01) |

(52) U.S. Cl.
CPC .............. *B21D 7/063* (2013.01); *B21D 7/00* (2013.01); *B21D 7/06* (2013.01); *B21F 1/002* (2013.01); *B23P 6/002* (2013.01); *B21D 11/07* (2013.01); *B25B 33/00* (2013.01); *F02B 37/186* (2013.01)

(58) Field of Classification Search
CPC . B21D 7/02; B21D 7/024; B21D 7/06; B21D 7/063; B21D 9/08; B21D 9/085; B21D 11/07; B21D 11/10; B21F 1/002; B21F 1/004; B21F 1/04; B23P 6/002; F02B 37/186; F01D 17/10; F01D 17/105; F01D 17/20
See application file for complete search history.

(56) References Cited

U.S. PATENT DOCUMENTS

| | | | | |
|---|---|---|---|---|
| 1,964,550 A | * | 6/1934 | Abramson | ............... B21D 7/06 72/389.7 |
| 2,096,574 A | * | 10/1937 | Denny | ..................... B21D 7/06 269/25 |
| 3,585,662 A | | 6/1971 | Boyajian | |
| 4,077,249 A | * | 3/1978 | Schmitter | .............. B21D 7/063 72/390.2 |
| 4,136,549 A | | 1/1979 | Lytle et al. | |
| 5,816,047 A | | 10/1998 | Zurlo | |

(Continued)

FOREIGN PATENT DOCUMENTS

| | | |
|---|---|---|
| DE | 1925695 A1 | 2/1970 |
| DE | 20200311 U1 | 5/2003 |

(Continued)

OTHER PUBLICATIONS

International Search Report and Written Opinion, regarding PCT/US2023/086356, issued Apr. 26, 2024 (16 pages).

*Primary Examiner* — Debra M Sullivan
*Assistant Examiner* — Matthew Stephens
(74) *Attorney, Agent, or Firm* — Robinson IP Law, PLLC

(57) ABSTRACT

A bending tool for shortening the length of a wastegate actuator arm (or "linkage") of a turbocharger system of an automobile by applying or otherwise creating a bend or dent in a wastegate actuator arm to repair a leaky wastegate, and a method of repairing a leaky wastegate valve of a turbocharger system of an automobile without disassembling or removing components of the turbocharger system.

14 Claims, 13 Drawing Sheets

(56) References Cited

U.S. PATENT DOCUMENTS

| | | | |
|---|---|---|---|
| 6,101,862 | A | 8/2000 | Rzasa et al. |
| 6,487,889 | B1 | 12/2002 | Bates et al. |
| 7,140,106 | B1 | 11/2006 | Reynolds |
| 9,869,239 | B2 | 1/2018 | Saeki |
| 10,746,093 | B2 | 8/2020 | Dudar |
| 2010/0282350 | A1 | 11/2010 | Lofving et al. |
| 2011/0253116 | A1 | 10/2011 | Eiraku |
| 2015/0364889 | A1 | 12/2015 | Frenken |
| 2017/0191429 | A1 | 7/2017 | Tylutki et al. |
| 2020/0067249 | A1 | 2/2020 | Liao et al. |
| 2021/0408749 | A1 | 12/2021 | Keller et al. |

FOREIGN PATENT DOCUMENTS

| | | | | |
|---|---|---|---|---|
| DE | 102007021526 | A1 | 11/2008 | |
| DE | 102007025077 | A1 | 12/2008 | |
| DE | 102007039218 | A1 | 2/2009 | |
| DE | 102008032929 | A1 | 1/2010 | |
| DE | 102008033862 | A1 * | 1/2010 | ............. F01D 5/005 |
| DE | 102009036914 | A1 | 3/2011 | |
| DE | 102010007600 | A1 | 8/2011 | |
| DE | 102011088005 | A1 | 6/2013 | |
| DE | 202019100081 | U1 | 1/2019 | |
| EP | 2643571 | B1 | 2/2016 | |
| EP | 1988265 | B1 | 7/2016 | |
| GB | 1090024 | A | 11/1967 | |
| GB | 2020586 | A * | 11/1979 | ............. B21D 7/063 |
| WO | 2014187651 | A1 | 11/2014 | |
| WO | 2016139800 | A1 | 9/2016 | |

* cited by examiner

AUTOMOTIVE BENDING TOOL AND METHOD OF REPAIRING AUTOMOBILE TURBOCHARGER SYSTEM WITHOUT REMOVING OR DISASSEMBLING COMPONENTS OF THE TURBOCHARGER

FIELD

This disclosure relates to the field of automobile repair. More particularly, this disclosure relates to automobile repair for repairing an automobile turbocharger system.

BACKGROUND

A turbocharger in an internal combustion engine for an automobile is an important component of the overall automobile engine because it provides a way to synergistically use the kinetic energy from the flow of exhaust gases from an automobile to compress intake gas which causes additional air to reach the engine cylinders and increase capacity, and improve the performance of the automobile. Controlling the flow and the pressure of exhaust gases in a turbocharger is critically important. Modern turbocharger systems typically control the flow direction and pressure limits of such exhaust gases using an actuator that selectively moves an actuator arm which is connected to a wastegate valve. An important purpose of the wastegate is to divert excess exhaust gases away from a turbine of a turbocharger. If excess gases are not diverted, too much exhaust gases may enter the turbine and damage the turbine.

One common problem with turbocharger systems is that the wastegate sometimes becomes loose and is unable to seal which can cause a drop in the exhaust pressure and under drive the turbine and cause power under boost. This can be a serious problem if not corrected and can end up causing a turbo charger under boost problem which, in some vehicles, generates an error code P0299. In order to repair leaky wastegates, it is necessary to remove a turbocharger system from a vehicle engine, replace the wastegate, and then reassemble the turbocharger system. These steps are often expensive, often costing an automobile owner thousands of dollars to fix.

What is needed, therefore, is a cheaper and more efficient way to repair turbocharger wastegates without the many steps required by the conventional method of replacing turbocharger wastegates.

SUMMARY

The above and other needs are met by a bending tool configured for hand-held use, the bending tool comprising a drive device further comprising an outer shell further comprising an outer shell first end and an outer shell second end; and a movable member located at least partially inside the outer shell and configured to move relative to the outer shell, the movable member further comprising a movable member first end and a movable member second end. The bending tool further comprises an elongate arm comprising an elongate arm first end and an elongate arm second end. The elongate arm further comprises a hollow shaft further comprising a hollow shaft first end, a hollow shaft second end, and a hollow shaft inner cavity; and a bending head attached to the hollow shaft second end. The bending head further comprises a bending head first end and a bending head second end; an open cavity at least partially defined between a first side wall, a first gap, a second side wall, a second gap, and an end side wall wherein the end side wall includes an indented section extending toward the bending head second end, and wherein the first gap is located between the first side wall and the end side wall, and wherein the second gap is located between the second side wall and the end wall; and a passage extending from the bending head first end into the open cavity. The bending tool further comprises a rod comprising a rod first end and a rod second end wherein the rod first end is in contact with the movable member second end, wherein at least a portion of the rod is located inside the hollow shaft inner cavity, wherein the rod is configured to move inside the hollow shaft inner cavity, and wherein the rod second end extends through the passage and into the open cavity. The bending tool further comprises a wedge member physically engaged with the rod second end and configured to fit inside and move inside the open cavity from a first position to a second position and from the second position to the first position, the wedge member further comprising a wedge bending surface facing the end side wall of the bending head, the wedge bending surface further comprising an outward facing central arch, a first indentation on a first side of the wedge member, a second indentation on a second side of the wedge member, a raised first edge along the first side of the wedge member, and a raised second edge along the second side of the wedge member.

In some embodiments, the elongate arm preferably further comprises a mounting member comprising a mounting member first end and a mounting member second end, wherein the mounting member first end is attached to the outer shell second end and wherein the mounting member second end is attached to the hollow shaft first end.

In some embodiments, the drive device preferably further comprises a hydraulic pump further comprising a primary pump cavity housing at least a portion of the movable member; a secondary pump cavity in fluid communication with the primary pump cavity; a piston configured for reciprocating inside the secondary pump cavity, the piston comprising a piston first end and a piston second end; and a pump arm hingedly attached to the outer shell and attached to the piston second end, wherein the pump arm is configured for manual movement by hand to reciprocate the piston inside the secondary pump cavity to force fluid from the secondary pump cavity to the primary pump cavity in order to move the movable member.

In some embodiments, the end side wall preferably further comprises an end side wall first edge and an end side wall second edge, and wherein the end side wall first edge is curved toward the bending head second end and wherein the end side wall second edge is curved toward the bending head second end.

In some embodiments, the end side wall first edge is preferably curved toward the bending head second end at an angle θ ranging from 3 degrees to 15 degrees, and wherein the end side wall second edge is curved toward the bending head second end at an angle λ ranging from 3 degrees to 15 degrees.

In another aspect, a method for repairing a leaky wastegate on an engine turbocharger system of an automobile without disassembling or removing components of the turbocharger system is disclosed. The method comprises inserting a bending tool from outside an automobile to a location adjacent to a turbocharger wastegate actuator arm of the automobile, wherein the bending tool includes a bending head; engaging the bending head with the turbocharger wastegate actuator arm; and actuating the bending tool to shorten the length of the turbocharger wastegate actuator arm.

In some embodiments, the inserting operation preferably further comprises inserting a bending tool from outside an automobile to a location adjacent to a turbocharger wastegate actuator arm of the automobile, wherein the bending tool further comprises a bending head further comprising a bending head first end and a bending head second end; and an open cavity at least partially defined between a first side wall, a first gap, a second side wall, a second gap, and an end side wall wherein the end side wall includes an indented section extending toward the bending head second end, and wherein the first gap is located between the first side wall and the end side wall, and wherein the second gap is located between the second side wall and the end wall; and a wedge member physically engaged with the rod second end and configured to fit inside and move inside the open cavity from a first position to a second position and from the second position to the first position, the wedge member further comprising a wedge bending surface facing the end side wall of the bending head, the wedge bending surface further comprising an outward facing central arch, a first indentation on a first side of the wedge member, a second indentation on a second side of the wedge member, a raised first edge along the first side of the wedge member, and a raised second edge along the second side of the wedge member.

In some embodiments, the engaging operation preferably further comprises engaging the bending head with the turbocharger wastegate actuator arm such that a portion of the turbocharger wastegate actuator arm extends inside the open cavity, through the first gap and the second gap, and between the end side wall and the wedge bending surface.

In some embodiments, the actuating operation preferably further comprises actuating the bending tool such that the wedge member moves from the first position to the second position placing the wedge bending surface closer to the end side wall and thereby bending the turbocharger wastegate actuator arm in order to shorten the length of the turbocharger wastegate actuator arm. In this embodiment, the bending tool further comprises a drive device further comprising an outer shell further comprising an outer shell first end and an outer shell second end; and a movable member located at least partially inside the outer shell and configured to move relative to the outer shell, the movable member further comprising a movable member first end and a movable member second end. In this embodiment, the bending tool further comprises an elongate arm comprising an elongate arm first end and an elongate arm second end, the elongate arm further comprising a hollow shaft further comprising a hollow shaft first end, a hollow shaft second end, and a hollow shaft inner cavity; and the bending head attached to the hollow shaft second end, the bending head further comprising a passage extending from the bending head first end into the open cavity. In this embodiment, the bending tool preferably further comprises a rod comprising a rod first end and a rod second end wherein the rod first end is in contact with the movable member second end, wherein at least a portion of the rod is located inside the hollow shaft inner cavity, wherein the rod is configured to move inside the hollow shaft inner cavity, and wherein the rod second end extends through the passage and into the open cavity; and the wedge member physically engaged with the rod second end.

In some embodiments, the methods described above may further comprise actuating the bending tool such that the wedge member moves from the second position to the first position placing the wedge bending surface further away from the end side wall and thereby releasing the turbocharger wastegate actuator arm from the bending tool.

In another aspect, a bending tool attachment member is disclosed, the bending tool attachment member comprising an elongate arm comprising an elongate arm first end and an elongate arm second end, the elongate arm further comprising a hollow shaft further comprising a hollow shaft first end, a hollow shaft second end, and a hollow shaft inner cavity. The elongate arm further comprises a bending head attached to the hollow shaft second end, the bending head further comprising a bending head first end and a bending head second end; an open cavity at least partially defined between a first side wall, a first gap, a second side wall, a second gap, and an end side wall wherein the end side wall includes an indented section extending toward the bending head second end, and wherein the first gap is located between the first side wall and the end side wall, and wherein the second gap is located between the second side wall and the end wall; and a passage extending from the bending head first end into the open cavity. The bending tool attachment member further comprises a rod comprising a rod first end and a rod second end wherein at least a portion of the rod is located inside the hollow shaft inner cavity, wherein the rod is configured to move inside the hollow shaft inner cavity, and wherein the rod second end extends through the passage and into the open cavity; and a wedge member physically engaged with the rod second end and configured to fit inside and move inside the open cavity from a first position to a second position and from the second position to the first position, the wedge member further comprising a wedge bending surface facing the end side wall of the bending head, the wedge bending surface further comprising an outward facing central arch, a first indentation on a first side of the wedge member, a second indentation on a second side of the wedge member, a raised first edge along the first side of the wedge member, and a raised second edge along the second side of the wedge member.

In some embodiments, the elongate arm preferably further comprises a mounting member comprising a mounting member first end and a mounting member second end, wherein the mounting member second end is attached to the hollow shaft first end, and wherein the mounting member first end is configured for attachment to a drive device.

In some embodiments, the drive device preferably further comprises a hydraulic pump.

In some embodiments, the drive device preferably further comprises an electro-mechanical actuator.

In some embodiments, the end side wall preferably further comprises an end side wall first edge and an end side wall second edge, and wherein the end side wall first edge is curved toward the bending head second end and wherein the end side wall second edge is curved toward the bending head second end.

In some embodiments, the end side wall first edge is preferably curved toward the bending head second end at an angle $\theta$ ranging from 3 degrees to 15 degrees, and wherein the end side wall second edge is curved toward the bending head second end at an angle $\lambda$ ranging from 3 degrees to 15 degrees.

The summary provided herein is intended to provide examples of particular disclosed embodiments and is not intended to cover all potential embodiments or combinations of embodiments. Therefore, this summary is not intended to limit the scope of the invention disclosure in any way, a function which is reserved for the appended claims.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

The figures are provided to illustrate concepts of the invention disclosure and are not intended to embody all potential embodiments of the invention. Therefore, the figures are not intended to limit the scope of the invention disclosure in any way, a function which is reserved for the appended claims.

DETAILED DESCRIPTION

FIGS. 1-5 show a preferred embodiment of a bending tool 100 that is configured for hand-held use. The bending tool 100 is specifically designed and shaped to operate as a repair tool for repairing a leaky wastegate in an automobile turbocharger system. More specifically, the bending tool is configured to shorten the length of a wastegate actuator arm (or "linkage") of a turbocharger system of an automobile to improve the seal of the wastegate without the need to disassemble the turbocharger system or automobile engine, and without removing the turbocharger system or engine from the automobile. This is accomplished by making or otherwise applying a dent or bend in the linkage to improve performance.

Figure 1:
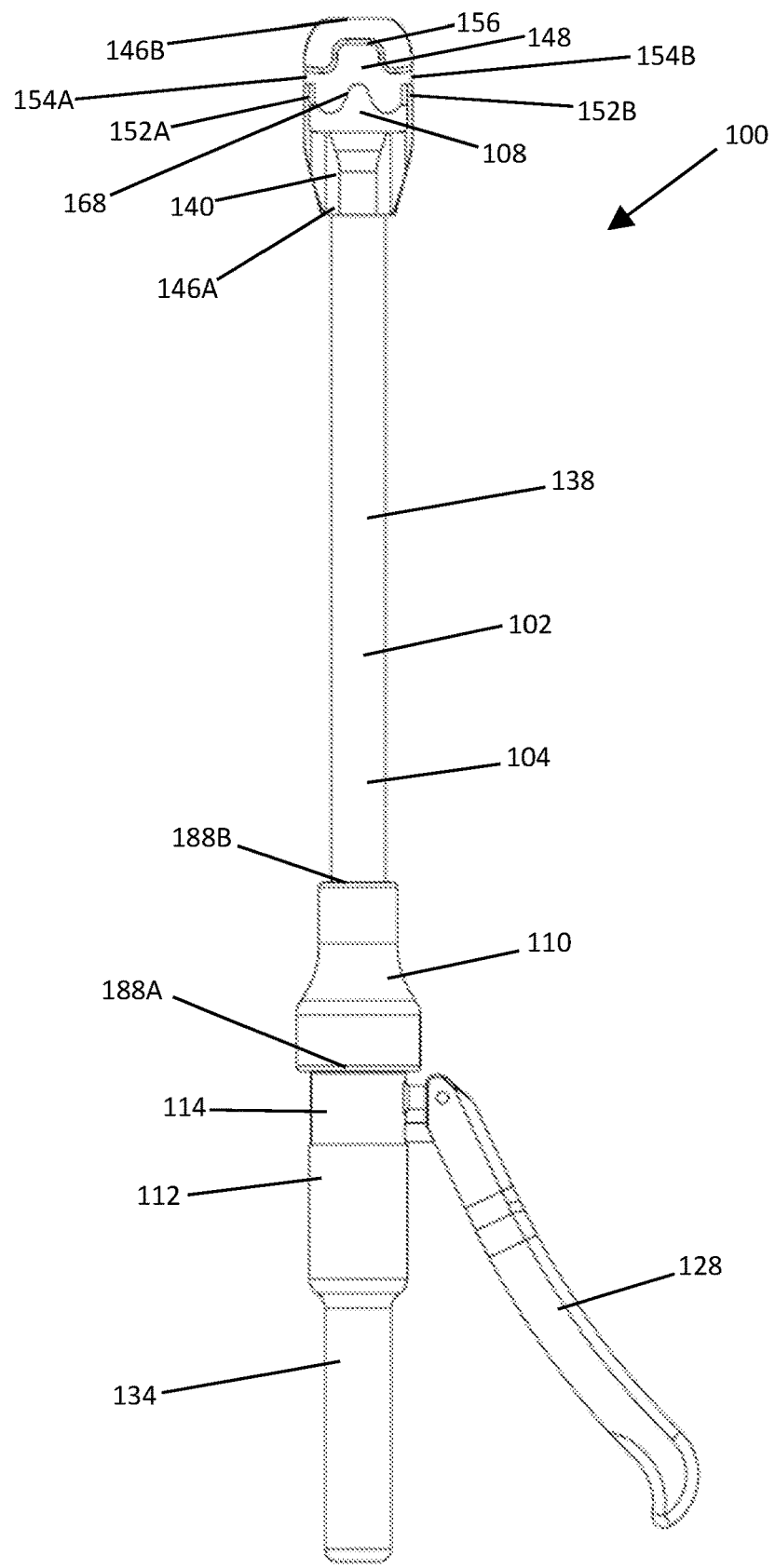
FIG. 1 shows a front view of an embodiment of a bending tool.
Figure 2:
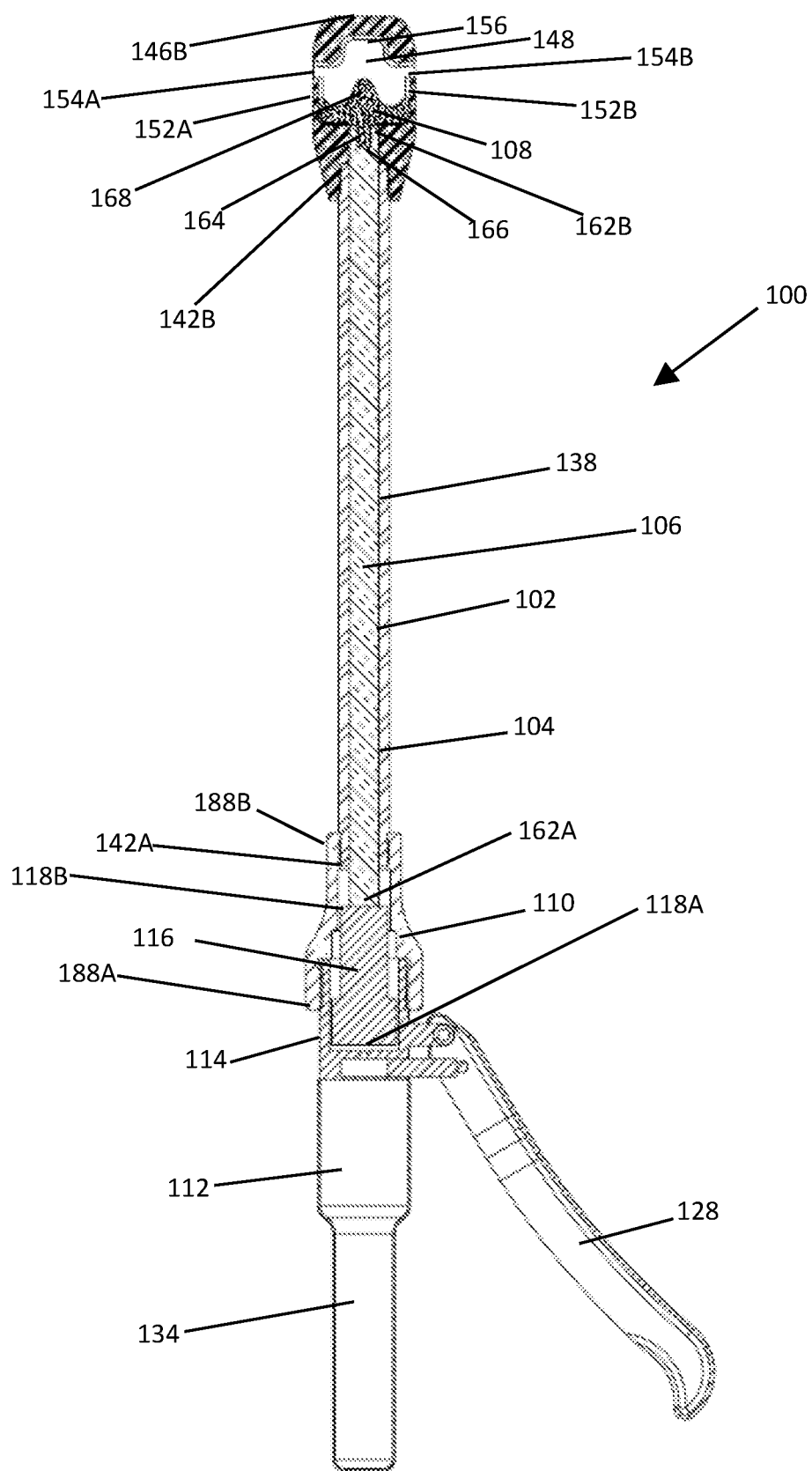
FIG. 2 shows a front cross-sectional view of the embodiment of the bending tool shown in FIG. 1.
Figure 3:
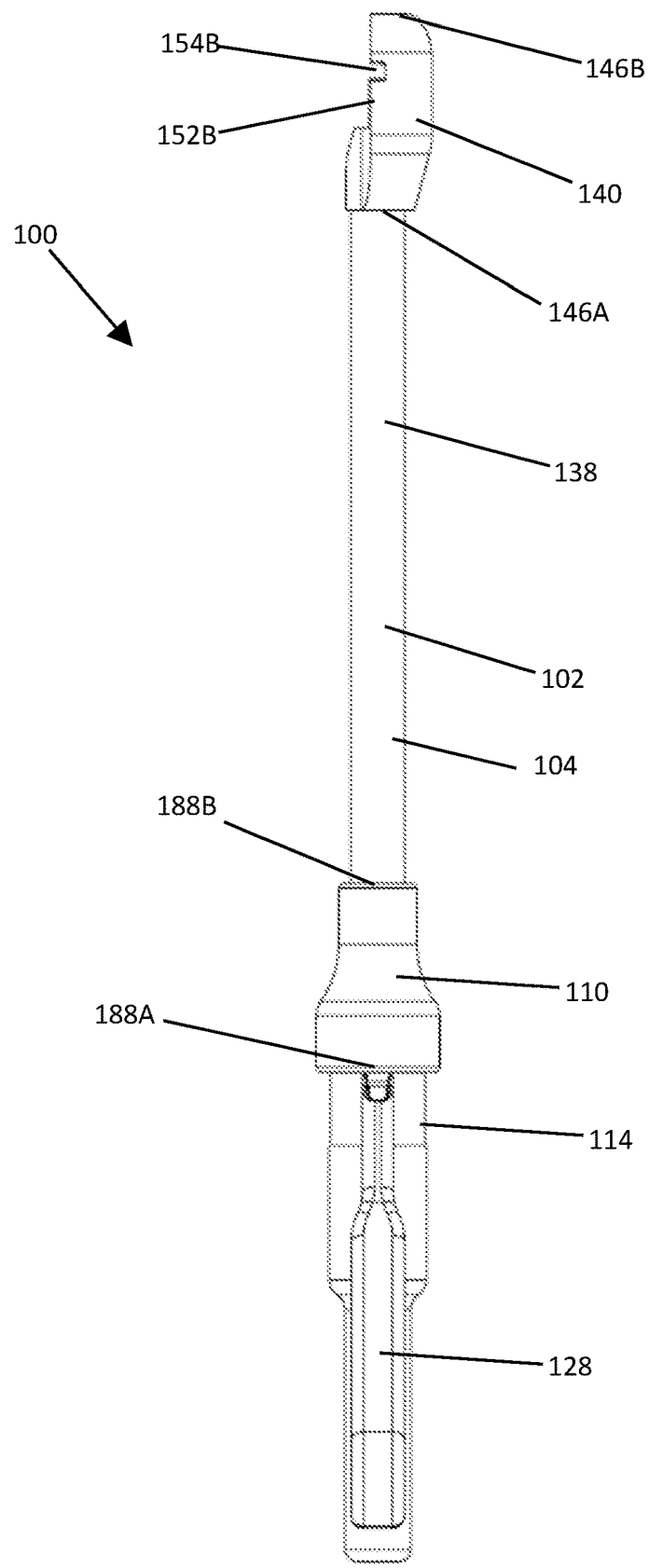
FIG. 3 shows a side view of the embodiment of the bending tool shown in FIG. 1 and FIG. 2.
Figure 4:
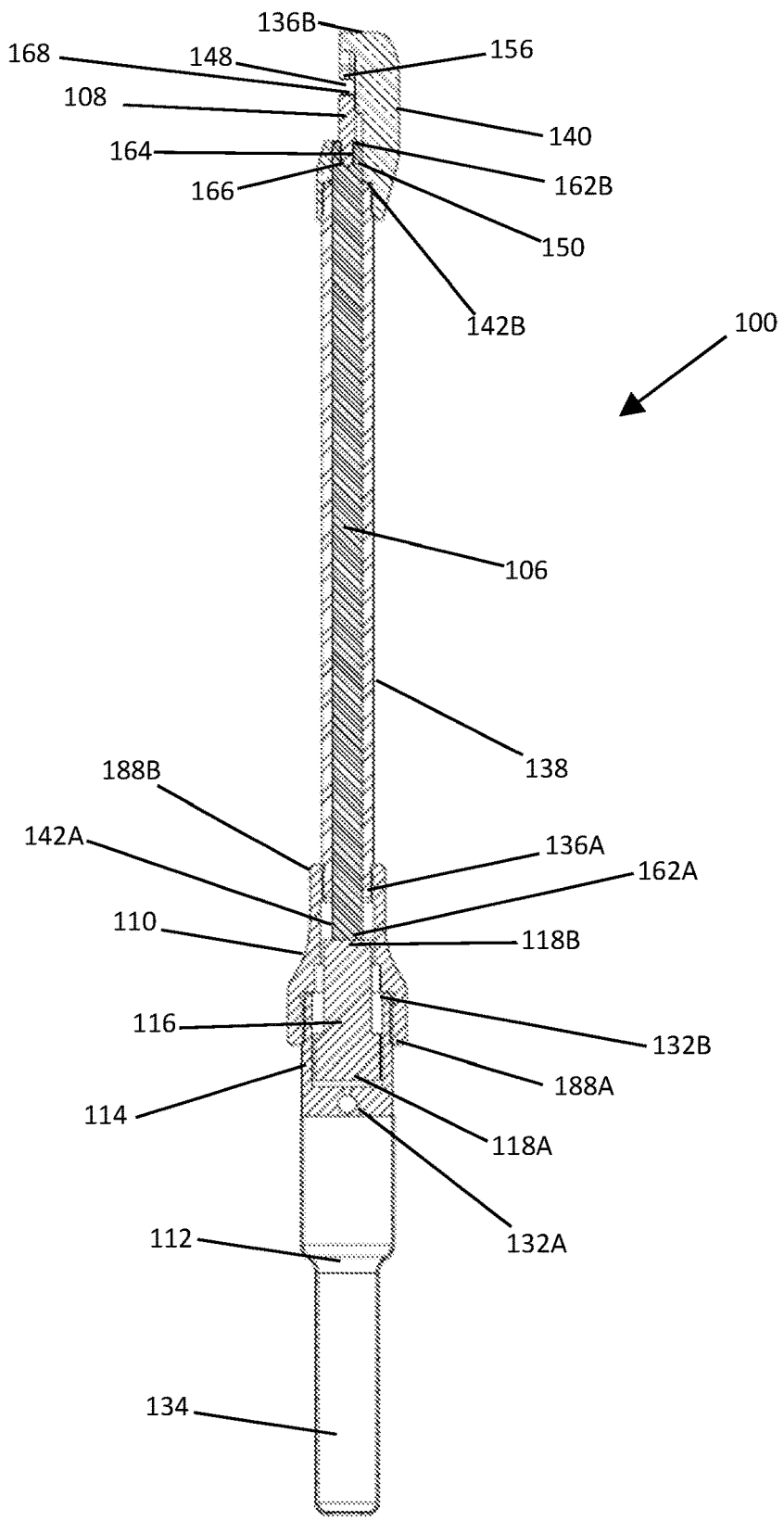
FIG. 4 shows a side cross-sectional view of the embodiment of the bending tool shown in FIGS. 1-3.
Figure 5:
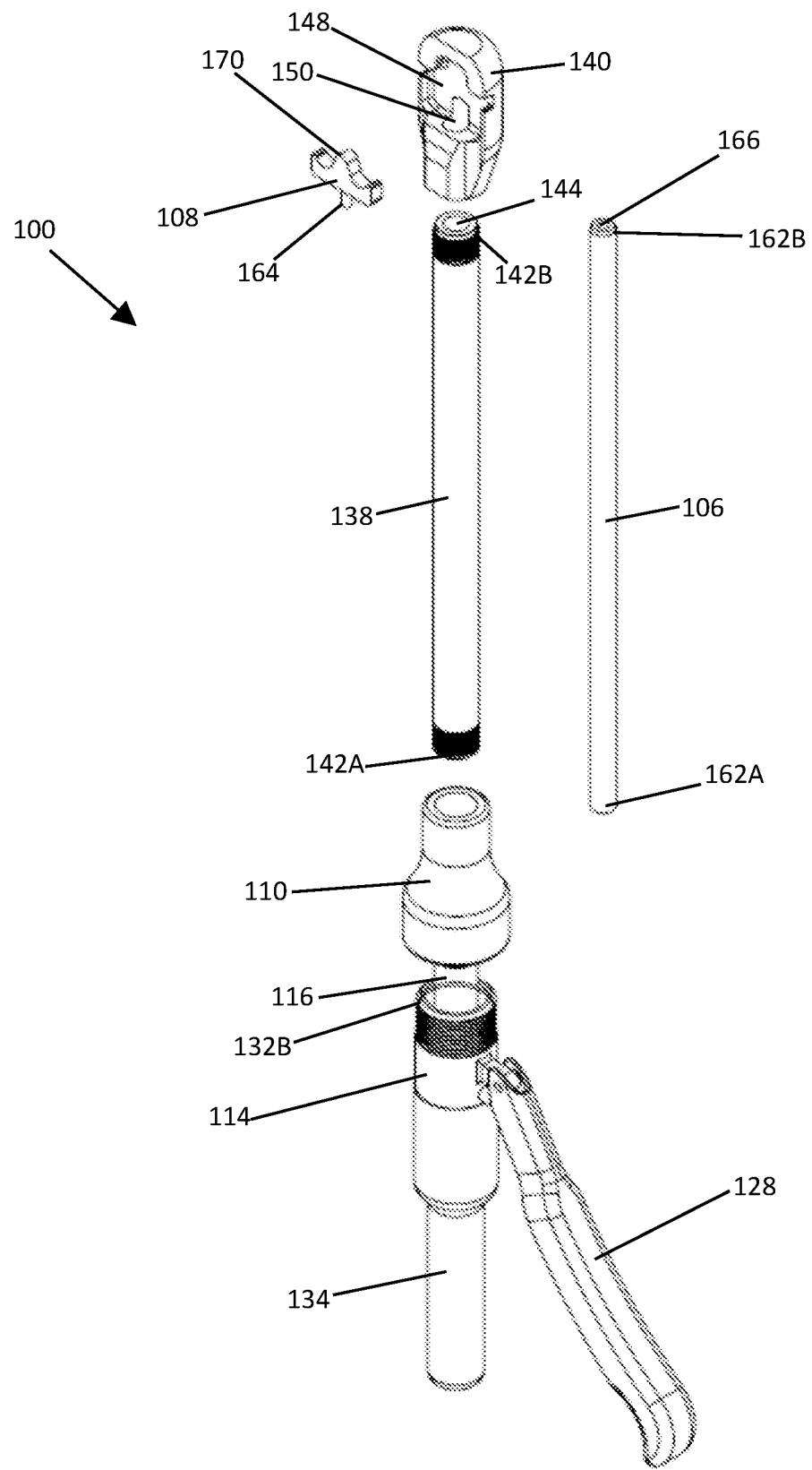
FIG. 5 shows an exploded view of the embodiment of the bending tool show in FIGS. 1-4.
Figure 6:
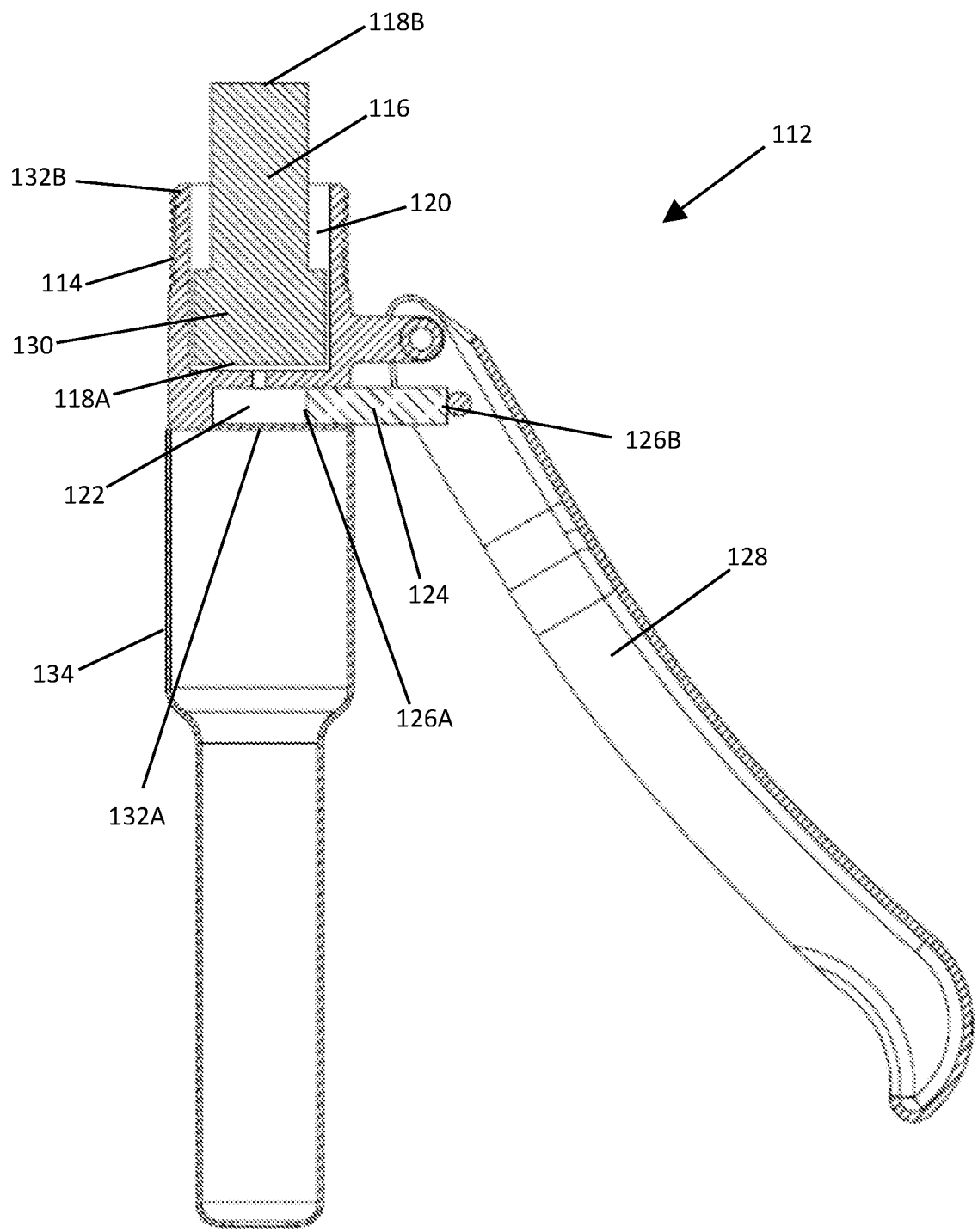
FIG. 6 shows a side cross-sectional view of a hydraulic pump for use as a component of the embodiment of the bending tool shown in FIGS. 1-5.
Figure 7:
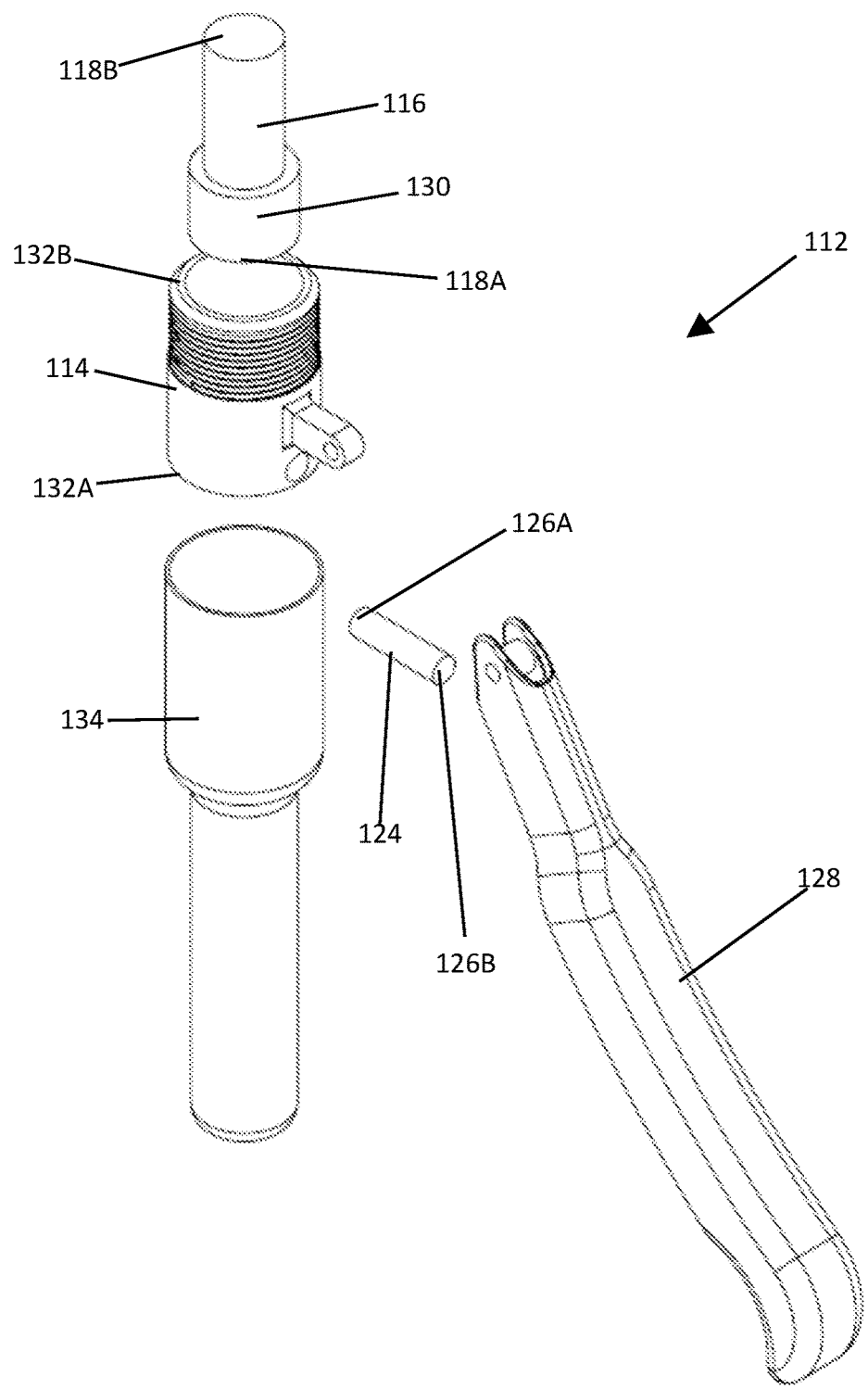
FIG. 7 shows a exploded view of the hydraulic pump shown in FIG. 6.

In the preferred embodiment shown in FIGS. 1-5, the bending tool 100 includes a bending tool attachment member 102. The bending tool attachment member 102 includes an elongate arm 104, a rod 106, a wedge member 108, and a mounting member 110. The bending tool attachment member 102 is configured for attachment to a drive device 112. In the preferred embodiment shown in FIGS. 1-5, the drive device 112 includes a hydraulic pump. Hydraulic pumps configured for handheld use are known including, for example, the YQK-70 Hydraulic Bending Tool available from Alibaba.com based in Hangzhou, China. FIGS. 6-7 show different views of the particular pump used in the embodiment shown in FIGS. 1-5. Although a hydraulic pump is a preferred drive device, other types of drive devices are contemplated including any device that is operable to convert electrical or mechanical power to mechanical motion. For example, an electro-mechanical drive device would be a device using electric power and transferring at least some of that power to mechanical energy.

The drive device 112 shown in FIGS. 1-7 includes an outer shell 114 and a movable member 116 located at least partially inside the outer shell 114. The movable member 116 is configured to move relative to the outer shell 114 and further includes a movable member first end 118A and a movable member second end 118B. The drive device 112 further includes a first pump cavity 120 housing at least a portion of the movable member 116. The drive device 112 further includes a second pump cavity 122 in fluid communication with the first pump cavity 120. The drive device 112 also includes a piston 124 configured for reciprocating inside the second pump cavity 122 wherein the piston 124 includes a piston first end 126A and a piston second end 126B. The drive device 112 further includes a pump arm 128 hingedly attached to the outer shell 114 and attached to the piston second end 126B. The pump arm 128 is configured for manual movement by hand to reciprocate the piston 124 inside the second pump cavity 122 to force fluid from the second pump cavity 122 to the first pump cavity 120 in order to move the movable member 116 such that the movable member second end 118B moves further away from the outer shell 114. The movable member 116 includes an expanded section 130 proximate to the movable member first end 118A to prevent the expanded section 130 from escaping the outer shell 114. The outer shell 114 includes an outer shell first end 132A and an outer shell second end 132B wherein the movable member second end 118B extends out beyond the outer shell second end 132B. The drive device 112 further includes a grip member 134 that is preferably attached to the outer shell first end 132A to facilitate handheld gripping by a user.

With reference back to FIGS. 1-5 and the bending tool attachment member 102, the elongate arm 104 further includes an elongate arm first end 136A, an elongate arm second end 136B, a hollow shaft 138, and a bending head 140. The hollow shaft 138 further includes a hollow shaft first end 142A, a hollow shaft second end 142B, and a hollow shaft inner cavity 144. The hollow shaft 138 includes a length that preferably ranges from 25 cm to 35 cm. The length of the hollow shaft 138 is a critical component of the bending tool attachment member 102 and is one feature that sets the bending tool attachment member 102 apart from other types of bending. More specifically, the configuration of the hollow shaft 138 is critically important to be long enough as well as small and compact enough to reach to a wastegate actuator arm of a turbocharger without removing turbocharger components from an automobile, but not so long as to make the bending tool 100 unwieldy and inoperable by hand. The bending head 140 further includes a bending head first end 146A, a bending head second end 146B, an open cavity 148, and a passage 150 extending from the bending head first end 146A to the open cavity 148. The hollow shaft second end 142B is attached to the bending head first end 146A.

Figure 8:
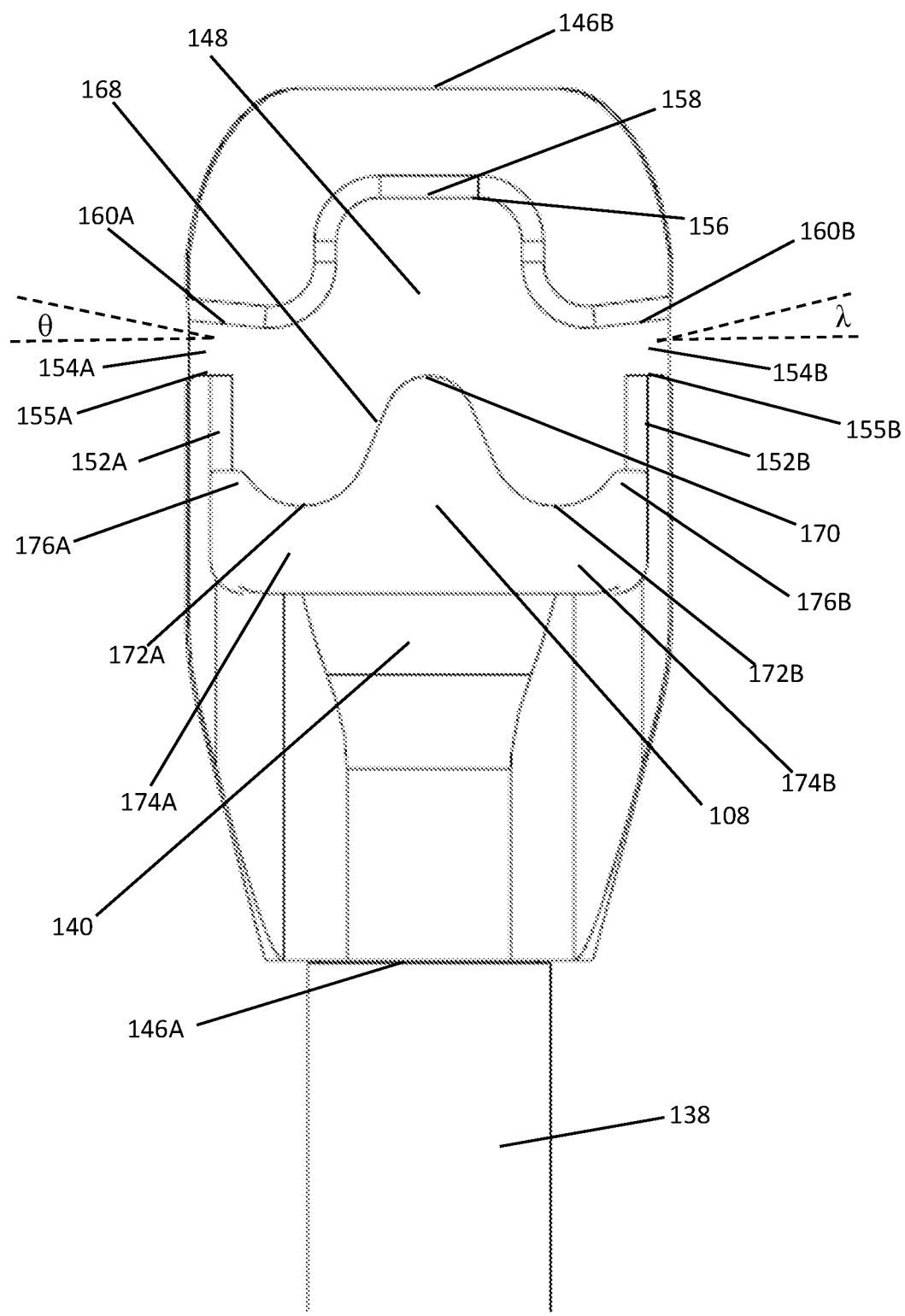
FIG. 8 shows a close-up view of a bending head of the embodiment of the bending tool shown in FIGS. 1-5.

The bending head 140 and its physical features are particularly important and critical. The open cavity 148 is at least partially defined between a first side wall 152A, a second side wall 152B situated opposite from the first side wall 152A, a first gap 154A, a second gap 154B situated opposite from the first gap 154A, and an end side wall 156. The first gap 154A is situated between the first side wall 152A and the end side wall 156, and the second gap 154B is situated between the second side wall 152B and the end side wall 156 as shown, for example, in FIG. 8. The first gap 154A and the second gap 154B are sized slightly larger than the diameter of common wastegate actuator arm of an automobile turbocharger (i.e., about 6.5 mm). The end side wall 156 includes an indented section 158 extending toward the bending head second end 146B. Preferably, the end side wall 156 further includes an end side wall first edge 160A and an end side wall second edge 160B wherein the end side wall first edge 160A is curved toward the bending head second end 146B and wherein the end side wall second edge 160B is curved toward the bending head second end 146B. Preferably, the end side wall first edge 160A is curved toward the bending head second end 146B at an angle θ ranging from 3 degrees to 15 degrees, and the end side wall second edge 160B is curved toward the bending head second end 160B at an angle λ ranging from 3 degrees to 15 degrees as shown, for example, in FIG. 8. The angles and/or curvature of the end side wall first edge 160A and the end side wall second edge 160B are critical to ensure that any wastegate actuator arm, when bent, remains straight outside the bending head 140. Because of the resilient spring back property of the steel it is important to bend the wastegate actuator arm slightly more than 180 degree, so that after releasing the pressure the wastegate actuator arm will spring back to 180 degrees and stay straight. Additionally, that extra bending will release the wastegate actuator arm from a bending head first back wall 155A and a bending head second back wall as shown in FIG. 8. Without this extra bending, the wastegate actuator arm would be hard very difficult release from the bending head 140 after bending.

With further reference to FIGS. 1-5 and the bending tool attachment member 102, the rod 106 further includes a rod first end 162A and a rod second end 162B. The rod first end 162A is in contact with the movable member second end 118B. At least a portion of the rod 106 is located inside the hollow shaft inner cavity 144, wherein the rod 106 is configured to move inside the hollow shaft inner cavity 144. The rod second end 162B extends through the passage 150 and into the open cavity 148.

Figure 9:
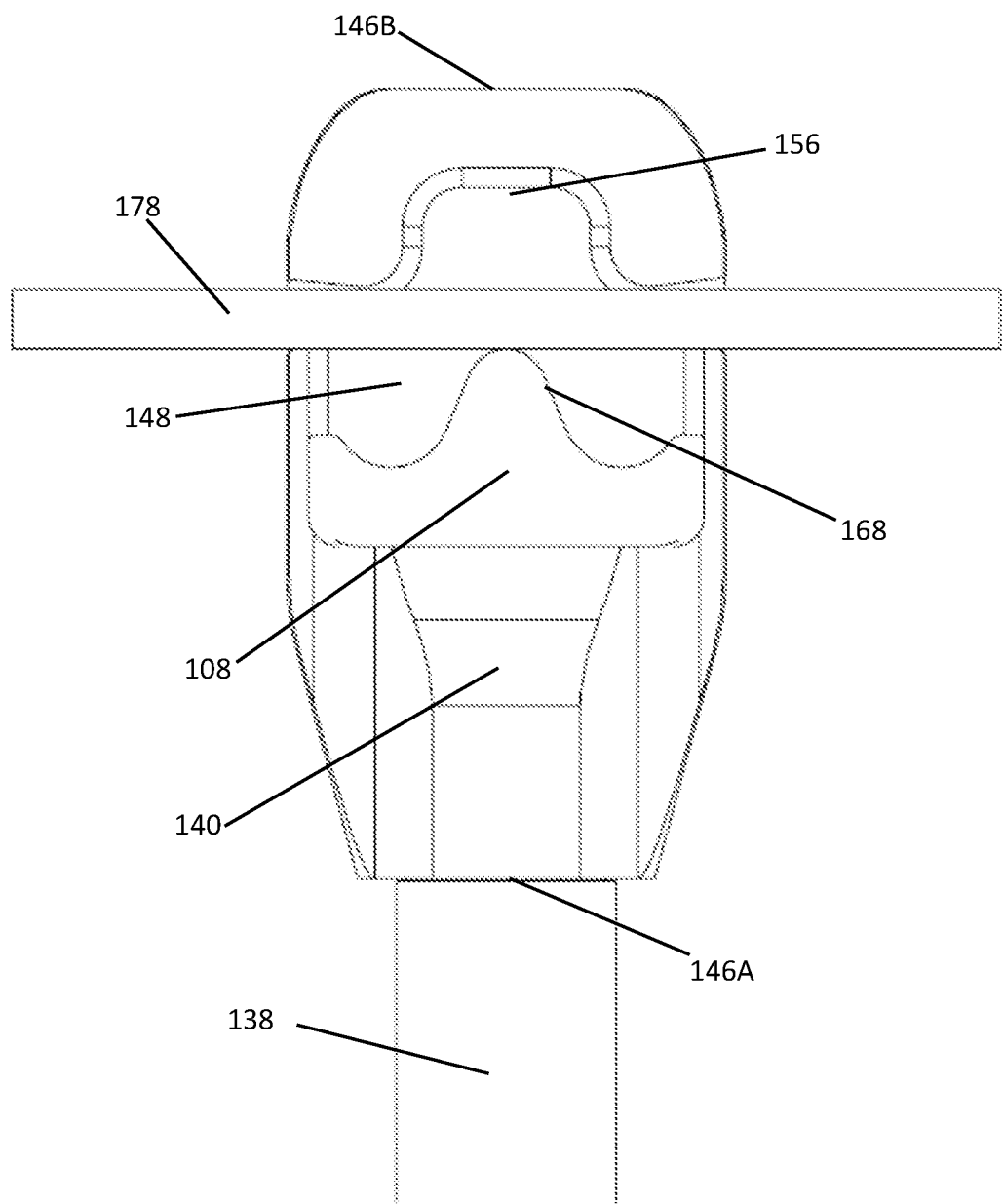
FIG. 9 shows a close-up view of the bending head of FIG. 8 being positioned for use relative to a wastegate actuator arm of a turbocharger system.
Figure 10:
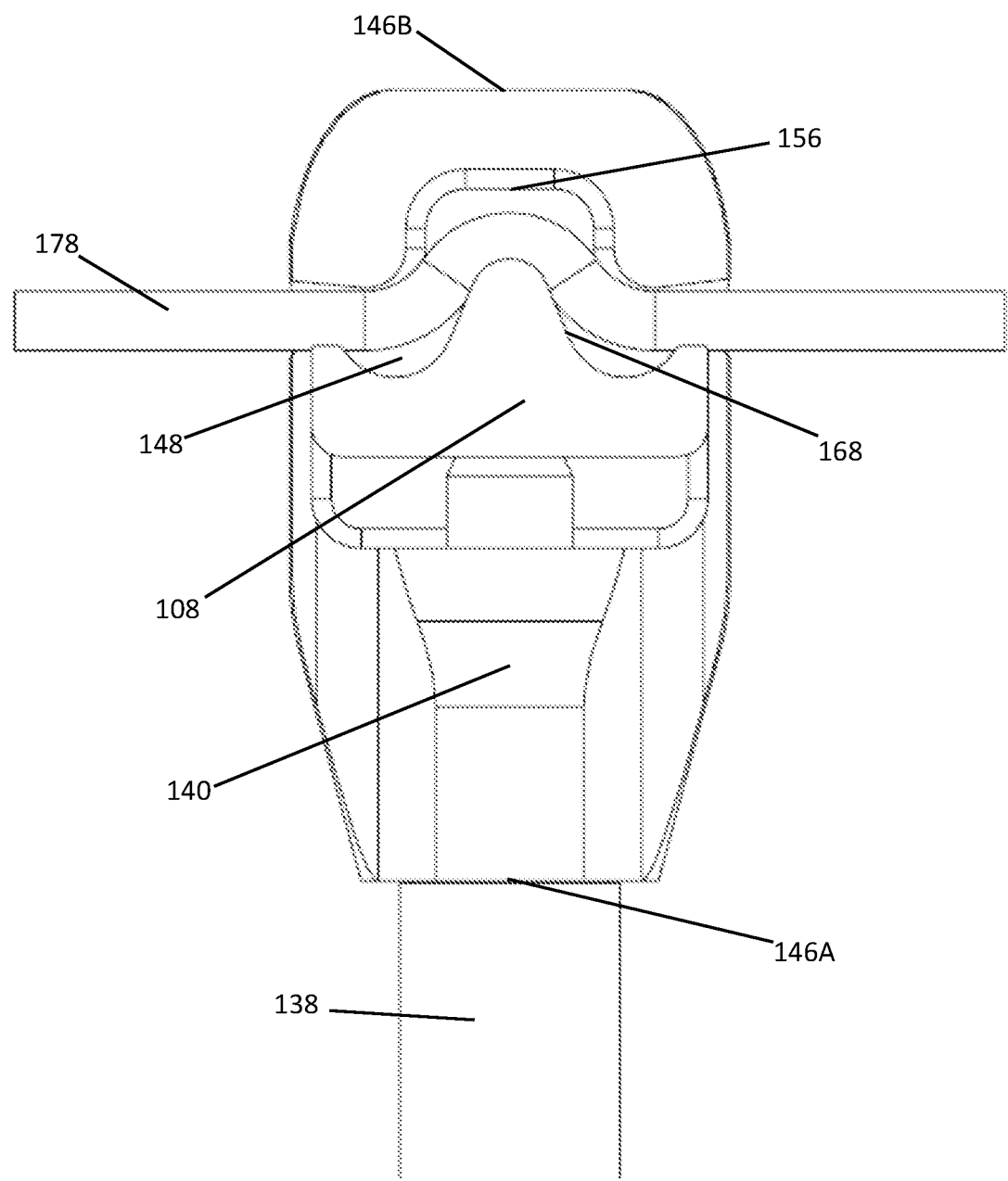
FIG. 10 shows a close-up view of the bending head of FIG. 9 after bending the wastegate actuator arm.

With further reference to FIGS. 1-5 and the bending tool attachment member 102, the wedge member 108 is either attached to or otherwise physically engaged with the rod second end 162B. In the embodiment shown in FIGS. 1-5, the wedge member 108 includes a wedge member extension 164 that extends inside a rod interior cavity 166 inside the rod 106. The wedge member 108 is sized and shaped to fit inside and move inside the open cavity 148 from a first position (shown in FIG. 9 before bending) to a second position (shown in FIG. 10 after bending) and from the second position back to the first position. The wedge member 108 further includes a wedge bending surface 168 facing the end side wall 156 of the bending head 140. The wedge bending surface 168 further includes an outward facing central arch 170, a first indentation 172A on a first side 174A of the wedge member 108, a second indentation 172B on a second side 174B of the wedge member 108, a raised first edge 176A along the first side 174A of the wedge member 108, and a raised second edge 176B along the second side 174B of the wedge member 108. Each of the first indentation 172A and the second indentation 172B are closer in distance than each of the central arch 170, the raised first edge 176A, and the raised second edge 176B to the rod second end 162B. The wedge member 108 has a wedge bending plane perpendicular to the wedge bending surface 168 and including a longitudinal centerline of the wedge bending surface 168. Each of the central arch 170, the first indention 172A, the second indention 172B, the raised first edge 176A, and the raised second edge 176B intersect the wedge bending plane.

Figure 11:
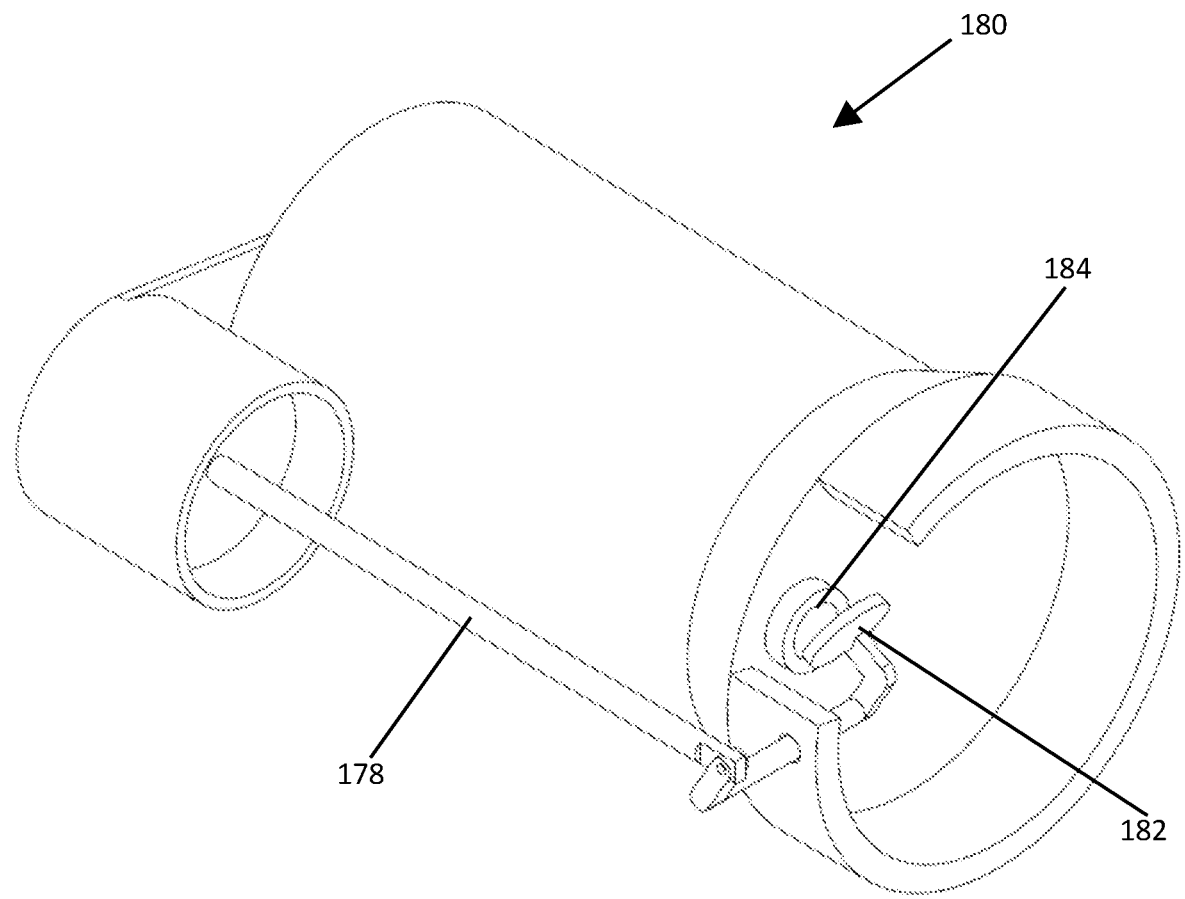
FIG. 11 shows a view of some components of an automobile turbocharger system.
Figure 12:
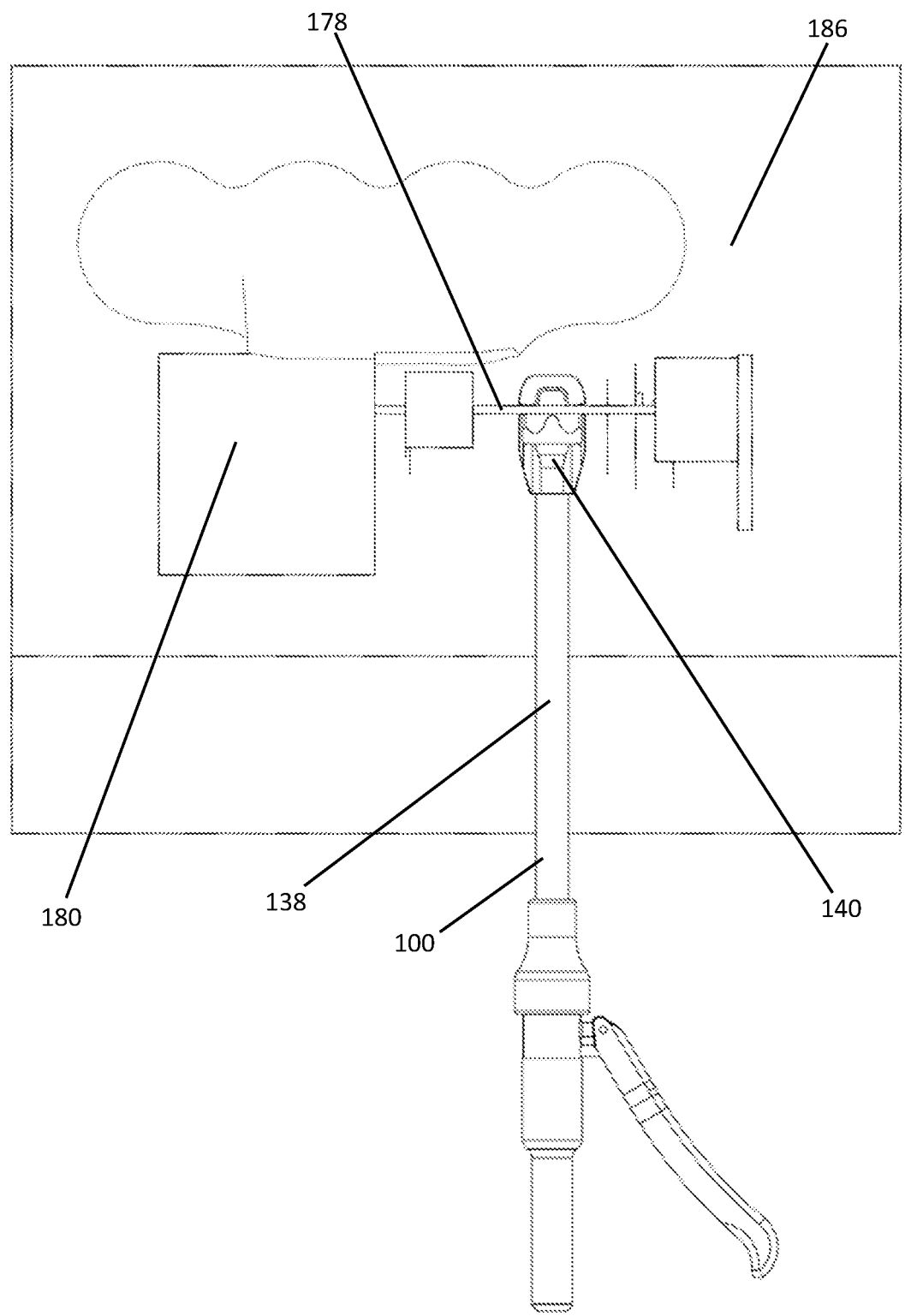
FIG. 12 shows a view of the bending tool shown in FIGS. 1-5 being position for use relative to a wastegate actuator arm.

When the embodiment of the bending tool 100 shown in FIGS. 1-5 is in use, the drive device 112 is activated by a user manually pumping the pump arm 128 which drives the piston 124 which further drives fluid into the first pump cavity 120, causing the movable member 116 to move such that the movable member second end 118B moves farther away from the outer shell second end 132B. The movable member second end 118B is in contact with the rod first end 162A such that, when the movable member 116 moves, the rod 106 also moves. This movement of the rod 106 causes the wedge member 108 to move from the first position (shown in FIG. 9) to the second position (shown in FIG. 10), thereby bending (and, as a result, shortening the length of) a wastegate actuator arm 178. Preferably, the wastegate actuator arm is shortened by a length of from 1 mm to 5 mm. The process is then reversed to move the wedge member 108 from the second position to the first position so that the bending tool 100 can be disengaged from the shortened wastegate actuator arm 178 and, thereby, disengaged from the automobile housing the turbocharger system including the wastegate actuator arm 178. FIG. 11 shows a perspective view of a basic automobile turbocharger system 180 including the wastegate actuator arm 178 and a wastegate valve 182 including a wastegate cap 183. If the wastegate cap 183 becomes loose, the turbocharger system 180 is unable to function efficiently which can ultimately cause turbo under boost condition where the power of an engine of automobile drops. The act of shortening the length of wastegate actuator arm 178 brings the wastegate cap 183 closer to a wastegate aperture 184 to improve the seal between the wastegate valve 182 and the wastegate aperture 184 when the wastegate vale 182 is intended to be closed. FIG. 12 shows a view of an automobile engine 186 including the turbocharger system 180 wherein the bending tool 100 is being positioned relative to the wastegate actuator arm 178 from outside the automobile without requiring any disassembly of the automobile engine 186 or the turbocharger system 180.

The bending tool 100 embodiment shown in FIGS. 1-5 further includes the mounting member 110 which connects the hollow shaft 138 to the drive device 112. More specifically, the outer shell second end 132B is attached to a mounting member first end 188A. Additionally, the hollow shaft first end 142A is attached to a mounting member second end 188B. In other embodiments, the hollow shaft 138 may attached directly to the outer shell second end 132B, or, alternatively, the mounting member 110 and the hollow shaft 138 may be formed as a single structure.

The different components of the bending tool 100 may be attached by various means including male/female connections using threaded surfaces as shown in FIGS. 1-5. The respective attachments shown in FIGS. 1-5 between the outer shell 114 and the mounting member 110, the mounting member 110 and the hollow shaft 138, the hollow shaft 138 and the bending head 140 are all by male/female connections using threaded surfaces. As stated above, the wedge member 108 preferably includes the wedge member extension 164 that extends inside the rod interior cavity 166 inside the rod 106. However, the wedge member 108 could also be more securely attached to the rod 106. Other means of attachment for attaching the various bending tool 100 components together include welding, adhesive, or other attachment means known to persons having ordinary skill in the art.

The various components of the bending tool 100 are preferably made of metals or metal alloys commonly used to make hand tools. Other materials with durable characteristics similar to such metals and metal alloys could also be used to make the various components of the bending tool 100.

Figure 13:
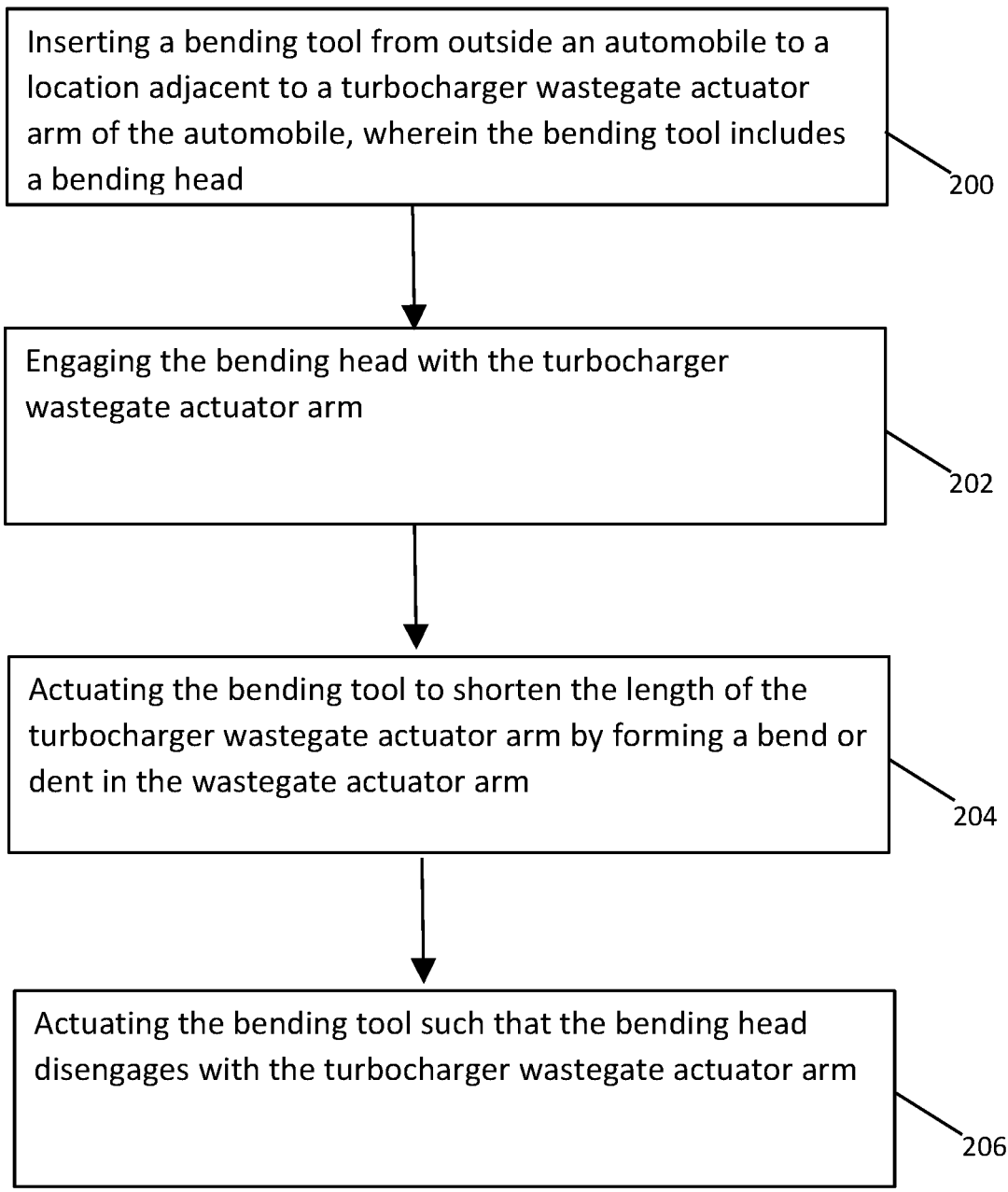
FIG. 13 shows a flowchart of method operations of a method for repairing a leaky wastegate on an engine turbocharger system of an automobile without disassembling the turbocharger system or removing the turbocharger system or turbocharger system components from the automobile.

In addition to the bending tool attachment member 102 and the bending tool 100 as a whole described above, a method for repairing a leaky wastegate on an engine turbocharger system of an automobile without disassembling or removing components of the turbocharger system is also disclosed and shown in FIG. 13. The method includes (200) inserting a bending tool from outside an automobile to a location adjacent to a turbocharger wastegate actuator arm of the automobile, wherein the bending tool includes a bending head. The method further includes (202) engaging the bending head with the turbocharger wastegate actuator arm. In a preferred embodiment, this operation includes engaging the bending head with the turbocharger wastegate actuator arm such that a portion of the turbocharger wastegate actuator arm extends inside an open cavity, through a first gap and a second gap, and between an end side wall and a wedge bending surface. The method further includes (204) actuating the bending tool to shorten the length of the turbocharger wastegate actuator arm. In a preferred embodiment, this operation includes actuating the bending tool such that the wedge member moves from a first position to a second position placing the wedge bending surface closer to the end side wall and thereby bending the turbocharger wastegate actuator arm in order to shorten the length of the turbocharger wastegate actuator arm. Preferably, the method further includes (206) actuating the bending tool such that the bending head disengages with the turbocharger wastegate actuator arm. In a preferred embodiment, this operation includes actuating the bending tool such that the wedge member moves from the second position to the first position placing the wedge bending surface further away from the end side wall and thereby releasing the turbocharger wastegate actuator arm from the bending tool.

The previously described embodiments of the present disclosure have many advantages, including a very cost-effective tool and method to repair a leaky wastegate of an automobile turbocharger system without requiring any disassembly of any parts of the turbo charger The conventional method of repairing a leaky wastegate of a turbocharger system is to disassemble the turbocharger which currently costs in the thousands of dollars. By using an embodiment of the bending tool and an embodiment of the method described herein, such task can be completed quickly without any disassembly of the automobile required, thereby providing a significant cost savings to an automobile owner. The unique length and width of the hollow shaft 138 of the bending tool as well as the unique shape and size of the bending head 140 provides a way for the bending head 140 to be positioned adjacent to a wastegate actuator arm of an automobile from a position outside the automobile without requiring any disassembly of the automobile. Embodiments of the bending tool described herein are preferably configured for handheld use, thereby making the bending tool portable and easy to use. Although electricity could be used to power the drive device 112 in some embodiments, for the embodiment shown in FIGS. 1-5, no electricity is required—only manual mechanical input from the hand of a user.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

Any element in a claim that does not explicitly state "means for" performing a specified function, or "step for" performing a specific function, is not to be interpreted as a "means" or "step" clause as specified in 35 U.S.C. § 112, ¶ 6. In particular, the use of "step of" in the claims herein is not intended to invoke the provisions of 35 U.S.C. § 112, ¶ 6.

What is claimed is:

1. A bending tool configured for hand-held use, the bending tool comprising:
   a drive device further comprising:
      an outer shell further comprising an outer shell first end and an outer shell second end; and
      a movable member located at least partially inside the outer shell and configured to move relative to the outer shell, the movable member further comprising a movable member first end and a movable member second end;
   an elongate arm comprising an elongate arm first end and an elongate arm second end, the elongate arm further comprising:
      a hollow shaft further comprising a hollow shaft first end, a hollow shaft second end, and a hollow shaft inner cavity; and
      a bending head attached to the hollow shaft second end, the bending head further comprising:
         a bending head first end and a bending head second end;
         an open cavity at least partially defined between a first side wall, a first gap, a second side wall, a second gap, and an end side wall wherein the end side wall includes an indented section extending toward the bending head second end, and wherein the first gap is located between the first side wall and the end side wall, and wherein the second gap is located between the second side wall and the end wall; and
         a passage extending from the bending head first end into the open cavity;
   a rod comprising a rod first end and a rod second end wherein the rod first end is in contact with the movable member second end, wherein at least a portion of the rod is located inside the hollow shaft inner cavity, wherein the rod is configured to move inside the hollow shaft inner cavity, and wherein the rod second end extends through the passage and into the open cavity; and a wedge member coupled to the rod second end and configured to fit inside and move inside the open cavity from a first position to a second position and from the second position to the first position, the wedge member further comprising a wedge bending surface facing the end side wall of the bending head, the wedge bending surface further comprising an outward facing central arch, a first indentation on a first side of the wedge member, a second indentation on a second side of the wedge member and spaced apart from the first indentation by the central arch, a raised first edge along the first side of the wedge member and spaced apart from the central arch by the first indentation, and a raised second edge along the second side of the wedge member and spaced apart from the central arch by the second indentation, wherein each of the first indentation and the second indentation are closer in distance than each of the central arch, the raised first edge, and the raised second edge to the rod second end, wherein the wedge member has a wedge bending plane perpendicular to the wedge bending surface and including a longitudinal centerline of the wedge bending surface, wherein each of the central arch, the first indention, the second indention, the raised first edge, and the raised second edge intersect the wedge bending plane.

2. The bending tool of claim 1 wherein the elongate arm further comprises a mounting member comprising a mounting member first end and a mounting member second end, wherein the mounting member first end is attached to the outer shell second end and wherein the mounting member second end is attached to the hollow shaft first end.

3. The bending tool of claim 1 wherein the drive device further comprises a hydraulic pump further comprising:
a primary pump cavity housing at least a portion of the movable member;
a secondary pump cavity in fluid communication with the primary pump cavity;
a piston configured for reciprocating inside the secondary pump cavity, the piston comprising a piston first end and a piston second end;
a pump arm hingedly attached to the outer shell and attached to the piston second end, wherein the pump arm is configured for manual movement by hand to reciprocate the piston inside the secondary pump cavity to force fluid from the secondary pump cavity to the primary pump cavity in order to move the movable member.

4. The bending tool of claim 1 wherein the end side wall further comprises an end side wall first edge and an end side wall second edge, and wherein the end side wall first edge is curved toward the bending head second end and wherein the end side wall second edge is curved toward the bending head second end.

5. The bending tool of claim 1 wherein the end side wall first edge is curved toward the bending head second end at an angle θ ranging from 3 degrees to 15 degrees, and wherein the end side wall second edge is curved toward the bending head second end at an angle λ ranging from 3 degrees to 15 degrees.

6. A method for repairing a leaky wastegate on an engine turbocharger system of an automobile without disassembling or removing components of the turbocharger system, the method comprising:
inserting a bending tool from outside an automobile to a location adjacent to a turbocharger wastegate actuator arm of the automobile, wherein the bending tool includes comprises:
an elongate arm comprising an elongate arm first end and an elongate arm second end, the elongate arm further comprising:
a hollow shaft further comprising a hollow shaft first end, a hollow shaft second end, and a hollow shaft inner cavity; and
a bending head attached to the hollow shaft second end, the bending head further comprising:
a bending head first end and a bending head second end; and
an open cavity at least partially defined between a first side wall, a first gap, a second side wall, a second gap, and an end side wall wherein the end side wall includes an indented section extending toward the bending head second end, and wherein the first gap is located between the first side wall and the end side wall, and wherein the second gap is located between the second side wall and the end wall; and
a passage extending from the bending head first end into the open cavity;
a rod comprising a rod first end and a rod second end wherein at least a portion of the rod is located inside the hollow shaft inner cavity, wherein the rod is configured to move inside the hollow shaft inner cavity, and wherein the rod second end extends through the passage and into the open cavity; and
a wedge member coupled to the rod second end and configured to fit inside and move inside the open cavity from a first position to a second position and from the second position to the first position, the wedge member further comprising a wedge bending surface facing the end side wall of the bending head, the wedge bending surface further comprising an outward facing central arch, a first indentation on a first side of the wedge member, a second indentation on a second side of the wedge member and spaced apart from the first indentation by the central arch, a raised first edge along the first side of the wedge member and spaced apart from the central arch by the first indentation, and a raised second edge along the second side of the wedge member and spaced apart from the central arch by the second indentation, wherein each of the first indentation and the second indentation are closer in distance than each of the central arch, the raised first edge, and the raised second edge to the rod second end, wherein the wedge member has a wedge bending plane perpendicular to the wedge bending surface and including a longitudinal centerline of the wedge bending surface, wherein each of the central arch, the first indention, the second indention, the raised first edge, and the raised second edge intersect the wedge bending plane;
engaging the bending head with the turbocharger wastegate actuator arm; and
actuating the bending tool to shorten the length of the turbocharger wastegate actuator arm.

7. The method of claim 6 wherein the engaging operation further comprises:
engaging the bending head with the turbocharger wastegate actuator arm such that a portion of the turbocharger wastegate actuator arm extends inside the open cavity, through the first gap and the second gap, and between the end side wall and the wedge bending surface.

8. The method of claim 7 wherein the actuating operation further comprises:
actuating the bending tool such that the wedge member moves from the first position to the second position placing the wedge bending surface closer to the end side wall and thereby bending the turbocharger wastegate actuator arm in order to shorten the length of the turbocharger wastegate actuator arm.

9. The method of claim 8 wherein the bending tool further comprises:
a drive device further comprising:
an outer shell further comprising an outer shell first end and an outer shell second end; and
a movable member located at least partially inside the outer shell and configured to move relative to the outer shell, the movable member further comprising a movable member first end and a movable member second end.

10. The method of claim 8 further comprising actuating the bending tool such that the wedge member moves from the second position to the first position placing the wedge bending surface further away from the end side wall and thereby releasing the turbocharger wastegate actuator arm from the bending tool.

11. A bending tool attachment member comprising:
an elongate arm comprising an elongate arm first end and an elongate arm second end, the elongate arm further comprising:
a hollow shaft further comprising a hollow shaft first end, a hollow shaft second end, and a hollow shaft inner cavity; and
a bending head attached to the hollow shaft second end, the bending head further comprising:
a bending head first end and a bending head second end;
an open cavity at least partially defined between a first side wall, a first gap, a second side wall, a second gap, and an end side wall wherein the end side wall includes an indented section extending toward the bending head second end, and wherein the first gap is located between the first side wall and the end side wall, and wherein the second gap is located between the second side wall and the end wall; and
a passage extending from the bending head first end into the open cavity;
a rod comprising a rod first end and a rod second end wherein at least a portion of the rod is located inside the hollow shaft inner cavity, wherein the rod is configured to move inside the hollow shaft inner cavity, and wherein the rod second end extends through the passage and into the open cavity; and
a wedge member coupled to the rod second end and configured to fit inside and move inside the open cavity from a first position to a second position and from the second position to the first position, the wedge member further comprising a wedge bending surface facing the end side wall of the bending head, the wedge bending surface further comprising an outward facing central arch, a first indentation on a first side of the wedge member, a second indentation on a second side of the wedge member and spaced apart from the first indentation by the central arch, a raised first edge along the first side of the wedge member and spaced apart from the central arch by the first indentation, and a raised second edge along the second side of the wedge member and spaced apart from the central arch by the second indentation, wherein each of the first indentation and the second indentation are closer in distance than each of the central arch, the raised first edge, and the raised second edge to the rod second end, wherein the wedge member has a wedge bending plane perpendicular to the wedge bending surface and including a longitudinal centerline of the wedge bending surface, wherein each of the central arch, the first indention, the second indention, the raised first edge, and the raised second edge intersect the wedge bending plane.

12. The bending tool attachment member of claim 11 wherein the elongate arm further comprises a mounting member comprising a mounting member first end and a mounting member second end, wherein the mounting member second end is attached to the hollow shaft first end, and wherein the mounting member first end is configured for attachment to a drive device.

13. The bending tool attachment member of claim 11 wherein the end side wall further comprises an end side wall first edge and an end side wall second edge, and wherein the end side wall first edge is curved toward the bending head second end and wherein the end side wall second edge is curved toward the bending head second end.

14. The bending tool attachment member of claim 11 wherein the end side wall first edge is curved toward the bending head second end at an angle θ ranging from 3 degrees to 15 degrees, and wherein the end side wall second edge is curved toward the bending head second end at an angle λ ranging from 3 degrees to 15 degrees.

* * * * *